United States Patent [19]

Bargfrede

[11] Patent Number: 5,050,710
[45] Date of Patent: Sep. 24, 1991

[54] WET DISC BRAKE MECHANISM

[75] Inventor: Brent C. Bargfrede, Dunlap, Ill.

[73] Assignee: Caterpillar Inc., Peoria, Ill.

[21] Appl. No.: 506,737

[22] Filed: Apr. 10, 1990

[51] Int. Cl.⁵ .............................................. F16D 55/02
[52] U.S. Cl. ................................ 188/71.6; 188/264 E
[58] Field of Search ........... 188/264 B, 264 D, 264 F, 188/264 CC, 264 E, 264 P, 71.5, 71.6, 305, 306, 106 F; 305/21, 22

[56] References Cited

U.S. PATENT DOCUMENTS

| | | | |
|---|---|---|---|
| 2,504,128 | 4/1950 | Jacobson et al. | 244/100 C |
| 2,775,331 | 12/1956 | Peterson | 188/264 E |
| 2,873,826 | 2/1959 | Werner | 188/71.6 X |
| 3,580,345 | 5/1971 | Brown et al. | 180/9.1 |
| 3,927,737 | 12/1975 | Prillinger et al. | 188/106 F |
| 3,941,219 | 3/1976 | Myers | 188/170 |
| 3,941,221 | 3/1976 | Pringle | 188/218 XL |
| 3,946,837 | 3/1976 | Houser | 188/72.4 |
| 3,994,352 | 11/1976 | Siorek . | |
| 4,418,775 | 12/1983 | Leroux | 180/9.62 |
| 4,576,256 | 3/1986 | Rogier | 188/264 B X |
| 4,736,821 | 4/1988 | Ries | 188/264 B X |
| 4,817,746 | 4/1989 | Purcell et al. | 180/9.1 |
| 4,881,609 | 11/1989 | Purcell et al. | 180/9.5 |

Primary Examiner—Robert J. Oberleitner
Assistant Examiner—Peter M. Poon
Attorney, Agent, or Firm—Charles E. Lanchantin, Jr.; Claude F. White

[57] ABSTRACT

A work vehicle includes lefthand and righthand suspension mechanisms individually having an elastomeric belt entrained about a plurality of roller wheels and a fron wheel assembly, with the front wheel assembly having inboard and outboard side portions connected together by a shaft and being mounted on a pivotable support member. The subject wet disc brake mechanism includes an annular housing assembly supporting the wheel shaft, a brake hub connected to the shaft, a brake assembly having a plurality of interleaved plates disposed within the housing assembly, and a plurality of internal passages for the ingress of a cooling fluid radially inwardly of the plates, the egress of the fluid radially outwardly of a collecting chamber defined within the housing assembly, and for delivering a control fluid to a service brake piston and a parking brake piston arranged in a compact overlapping manner. Moreover first and second pluralities of radial openings through the brake hub and housing assembly respectively promote radial cooling of the plates at a minimal back pressure.

13 Claims, 4 Drawing Sheets

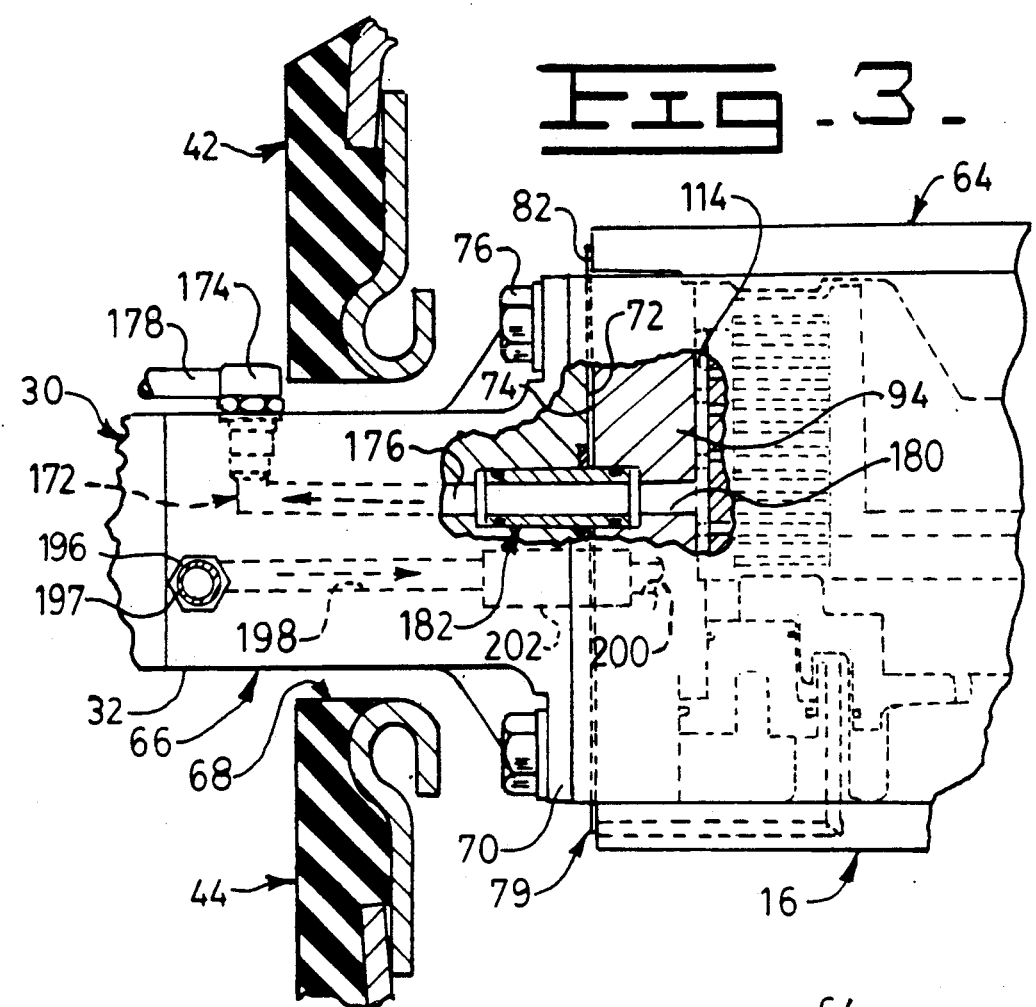
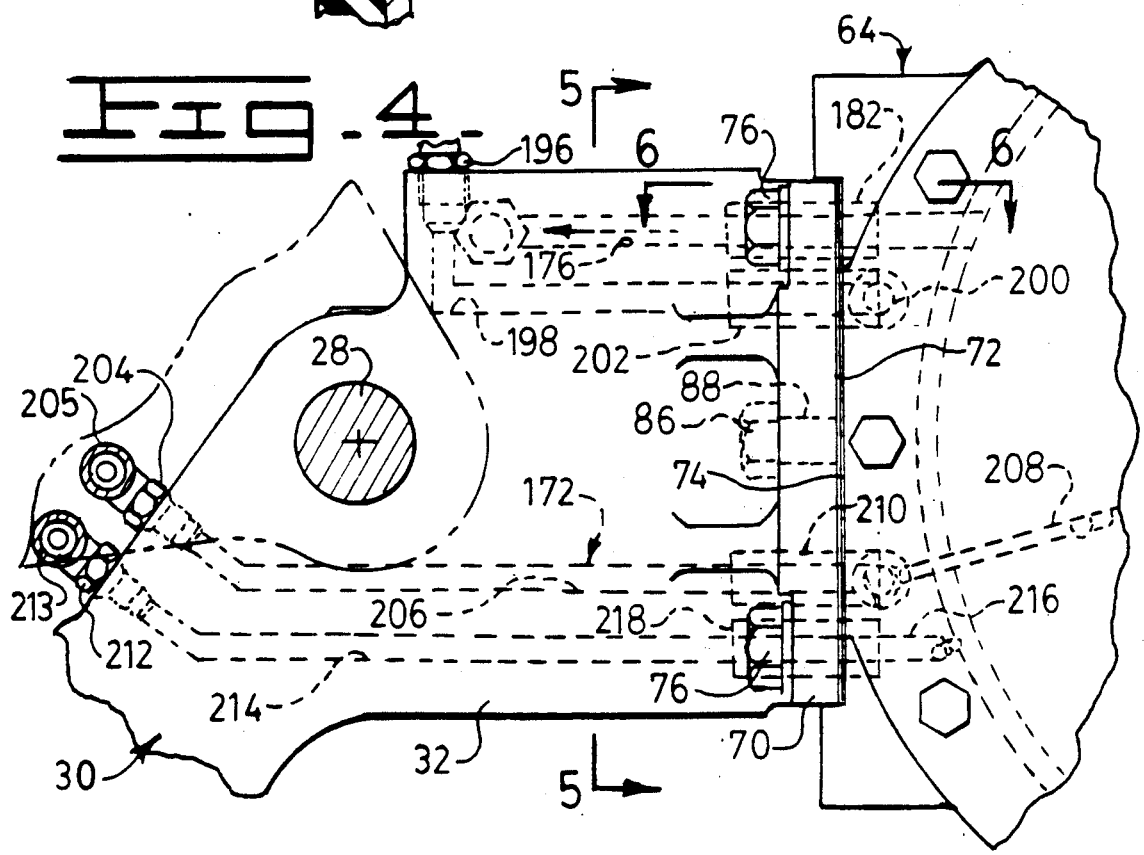

WET DISC BRAKE MECHANISM

TECHNICAL FIELD

This invention relates generally to a mechanism having a wet disc brake assembly disposed within a wheel assembly mounted on a movable support member, and more particularly to the compact structure thereof and the delivery of fluid to and from the brake assembly.

U. S. Pat. No. 4,881,609 issued Nov. 21, 1989 to R. J. Purcell, et al., discloses resilient suspension mechanism for a vehicle having an elastomeric drive belt entrained about a plurality of wheels. In that construction a front idler wheel is mounted on the front end of a pivotable support member that is resiliently urged forwardly and downwardly by the suspension mechanism, and two caliper disc brake assemblies are connected thereto which are located in a relatively protected spot between the side portions of the wheel. Each caliper disc brake assembly was spring applied and pressure released, and was of conventional construction such as Model 1-663-1SB offered by Hayes Industrial Brake, Inc. of Mequon, Wisconsin. Unfortunately, when that vehicle was tested under relatively harsh muddy and sandy operating conditions, the unsealed or open caliper disc brake assemblies wore out too quickly.

Moreover, each of the caliper disc brake assemblies mentioned above in the resilient suspension mechanism of U. S. Pat. No. 4,881,609 had one external tube or fluid connecting line for controllably applying the service brake piston, and one other external tube or fluid connecting line for normally holding a stack of Belleville spring washers from automatically engaging the brake assembly for parking purposes. These external lines and the fittings connecting them were so located externally that they were subject to leakage under relatively adverse operating conditions, and thus were not satisfactory.

Enclosed disc brake assemblies have been considered before for the non-driven wheels of a track type vehicle as is evidenced by U. S. Pat. No. 3,580,345 issued May 25, 1971 to A. W. Brown, et al. However, as far as is known they have been located in a relatively vulnerable spot such as extending axially outwardly away from the wheel, and have not been provided with an effective cooling system for the plurality of interleaved plates and discs incorporated therein. And, while U. S. Pat. No. 3,927,737 issued Dec. 23, 1975 to P. F. M. Prillinger et al., discloses an annular dual piston brake arrangement located radially within a wheel rim assembly of a relatively large earthmoving truck, such construction requires excessive space due at least in part to the coiled compression spring nests incorporated therein. Also, the fluid cooling flow disclosed therein travels radially outwardly between the surfaces of the plates and discs, and makes a right angle turn and travels axially along the individual teeth of the internal spline to one side thereof. This tends to inhibit the through-flow of cooling fluid and to raise the pressure radially within the plates and within the sealing rings.

Furthermore, it is desirable that the movable support member for the wheel be adjustable in the field to better align the transverse axis of the wheel to take into account the natural characteristics of the encircling elastomeric belt. Specifically, some of these flat elastomeric drive belts have a natural tendency to drift laterally toward one side of the wheels since they have a relatively large number of steel cables therein for strengthening purposes. The centrally disposed guide blocks that extend radially inwardly from the belt then have a tendency to rub against the side surfaces of the various idler wheels and to heat up and abrade. A relatively minor adjustment of the axis of the front idler wheel could compensate for at least some of such a tendency to drift, and extend the service life of the drive belt and/or suspension mechanism.

Accordingly, what is desired is a wet disc brake assembly for a wheel that is compactly located within the side portions thereof and that has a support and internal passage means therewithin to provide controlled operation of a service brake piston, and preferably also controlled operation of an associated parking brake piston and effective cooling of the interleaved plates and discs sealingly contained therein.

DISCLOSURE OF THE INVENTION

In accordance with one aspect of the invention, a wet disc brake mechanism is provided for a wheel assembly having an inner side portion, an outer side portion, and a shaft connecting them, and that includes a housing assembly for supporting the wheel shaft between the side portions, a support member extending radially inwardly between the side portions and connected to the housing assembly, a brake hub connected to the shaft, and a brake assembly having a first plurality of plates connected to the housing assembly, a second plurality of plates connected to the brake hub, and actuating means for clamping the plates together for braking purposes. The wet disc brake mechanism includes passage means within the support member and the housing assembly for delivering a control fluid to the actuating means for controlled operation of the brake assembly.

In accordance with another aspect of the invention, a wet disc brake mechanism is provided for a vehicle including a wheel assembly having inner and outer side portions, a shaft connecting the side portions, a housing assembly supporting the shaft for rotation about an axis, and a support member extending between the side portions and connected to the housing assembly. More particularly, the wet disc brake mechanism includes a brake hub connected to the shaft and defining a ring portion with an external spline and a first plurality of radial openings therethrough, and the housing assembly defines an internal spline, an annular collecting chamber, and a second plurality of radial openings between the internal spline and the collecting chamber. Further included are a brake assembly having a first plurality of plates connected to the internal spline, a second plurality of plates connected to the external spline, actuating means for clamping the plates together, and means for directing the ingress of a cooling fluid to the first plurality of radial openings and the exhausting of fluid from the collecting chamber after passing radially outwardly from the plates.

In accordance with a further aspect of the invention a wet disc brake mechanism is provided for a wheel assembly having inner and outer side portions, a shaft connecting the side portions, an annular housing assembly supporting the shaft and being located between the side portions, a brake hub connected to the shaft, an annular service brake piston disposed within the housing assembly, and an annular parking brake piston disposed within the housing assembly in a surrounding telescopic relationship with the service brake piston. The brake mechanism also includes first spring means for retracting the service brake piston, second spring means for urging the parking brake piston against the service brake piston, fluid retraction means for biasing the parking brake piston to a disengaged position against the action of the second spring means, and fluid actuating means for controllably urging the service brake piston toward a brake holding position with respect to the brake hub against the action of the first spring means.

BRIEF DESCRIPTION OF THE DRAWINGS

FIG. 3 is a diagrammatic, fragmentary, and enlarged top plan view of the wet disc brake mechanism of FIG. 1 as taken along line 3—3 thereof, and with a portion thereof broken away to illustrate details thereof in cross section;

FIG. 4 is a diagrammatic right side elevational view of FIG. 3;

BEST MODE FOR CARRYING OUT THE INVENTION

Figure 1:
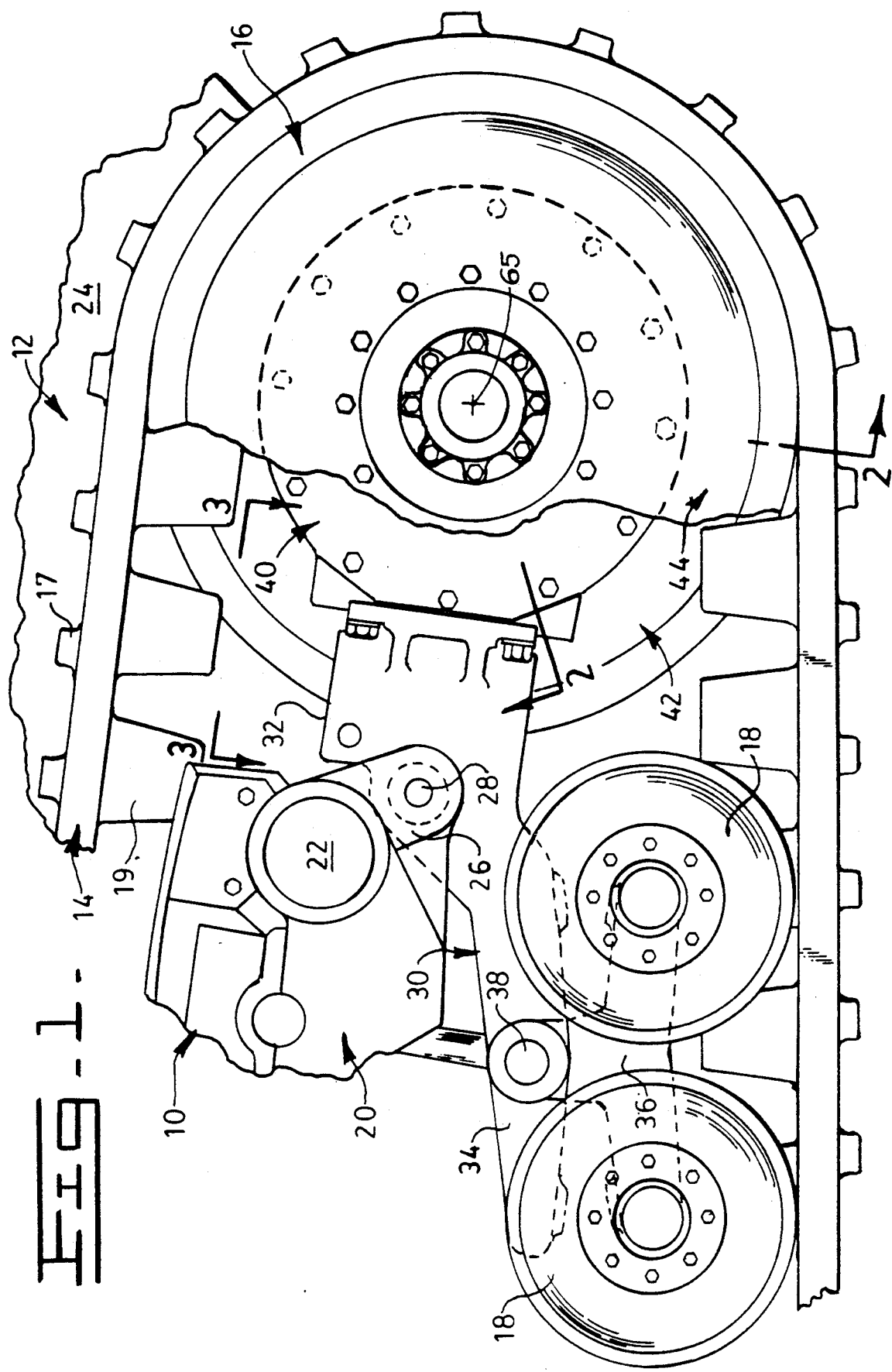
FIG. 1 is a diagrammatic right side elevational view of the front, lower portion of a vehicle employing a resilient suspension mechanism incorporating a wet disc brake mechanism constructed in accordance with the present invention, and having an outer side portion of a front wheel assembly partially broken away.
Figure 2:
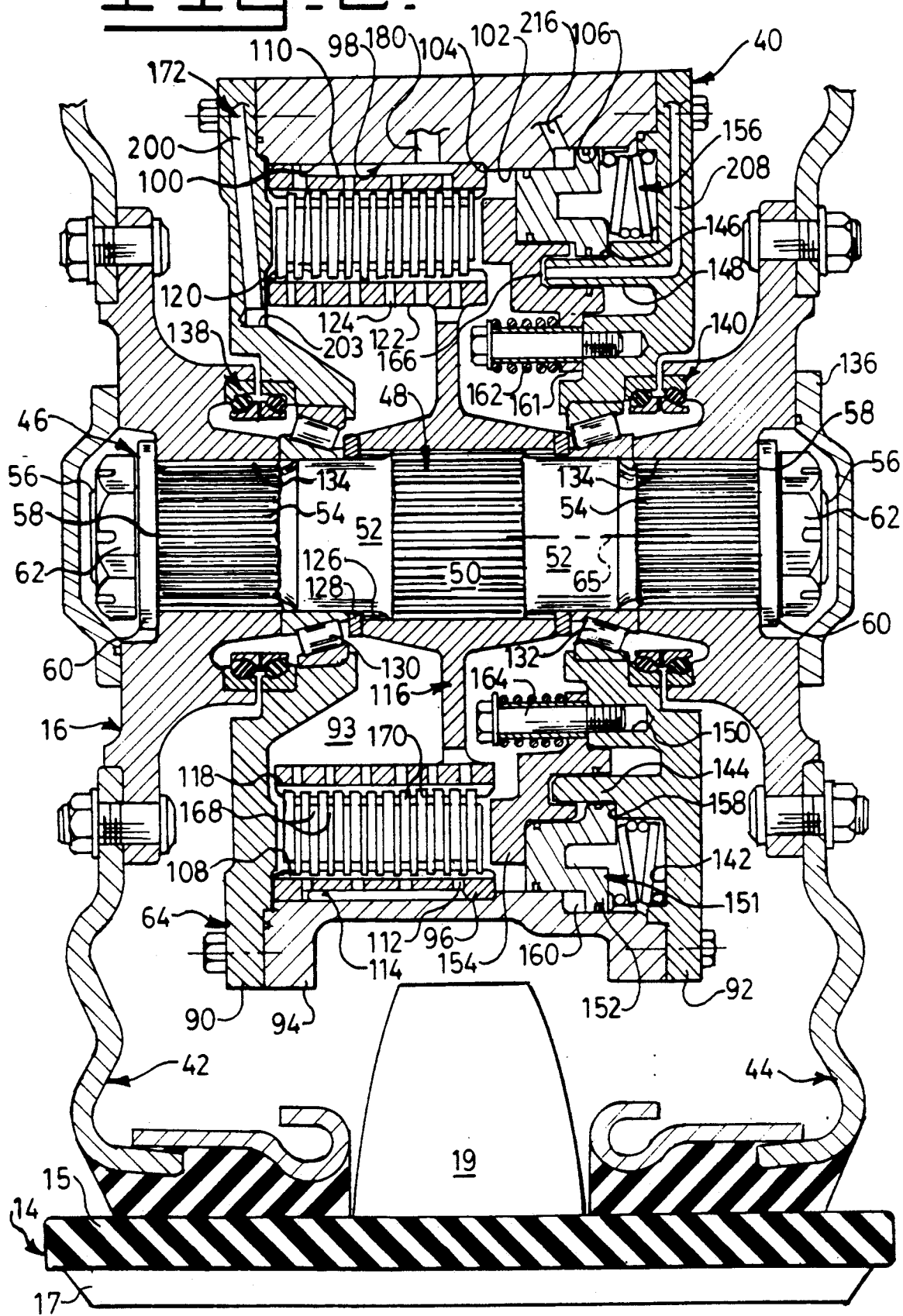
FIG. 2 is a diagrammatic and generally sectionalized and developed elevational view of the front wheel assembly as taken along the line 2—2 of FIG. 1.

With reference to FIG. 1, there is shown a front portion of a suspension mechanism 10 of a vehicle 12 of the endless track-laying type and including a ground-engaging endless track or elastomeric drive belt 14 entrained about a front idler wheel assembly 16, a plurality of pairs of laterally spaced roller wheels 18, two of which are illustrated, and an elevated rear drive wheel, not shown. As is illustrated in FIG. 2, the drive belt 14 is defined by a relatively flat elastomeric body 15 having a plurality of inclined external ground-engaging bars 17 and a plurality of internal guide members 19 integrally formed therewith. Although only the right-hand suspension mechanism is shown, it is to be appreciated that the lefthand suspension mechanism is duplicated in a mirror image manner on the other side of the vehicle and need not be further described.

The suspension mechanism 10 is of the type disclosed in U. S. Pat. No. 4,881,609 mentioned above, and includes a coupling assembly 20 having a laterally outwardly extending swingable support shaft 22 as is shown in FIG. 1. In general, the suspension mechanism controllably urges the support shaft 22 downwardly and forwardly with respect to a main frame 24 of the vehicle in a resilient manner. In this way the proper tension of the drive belt 14 is maintained and the front idler wheel assembly 16 is allowed to retract rearwardly in order to allow a tree limb, for example, to pass between the front idler wheel assembly 16 and the belt. The coupling assembly 20 further includes a pair of depending ears 26, one of which is shown, and a laterally extending pivot pin 28 connected between the ears.

A pivoting beam 30 is centrally mounted on the pivot pin 28 and defines a front leg or support member 32, and a rear leg or support member 34. A bogie member 36 is pivotably coupled to the rear leg 34 by a pivot pin 38, and the pairs of roller wheels 18 are secured to the front and rear portions of the bogie member and with the rear leg of the pivoting beam 30 extending longitudinally therebetween.

In accordance with the present invention, a wet disc brake mechanism 40 is provided for the front idler wheel assembly 16 as is shown best in FIG. 2. The wheel assembly includes an axially inner side portion 42, an axially outer side portion 44, and a shaft assembly 46 having a shaft 48 interconnecting the side portions. The shaft 48 has a centrally disposed external spline 50, a smooth cylindrical section 52 at either side thereof, an outer external spline 54 beyond each of those sections, and a threaded end section 56 defining an annular shoulder 58 at the outer end of each of the splines 54. The shaft assembly 46 further includes an annular thrust member or washer 60 and an internally threaded retaining nut 62 at the opposite ends of the shaft 48.

The wet disc brake mechanism 40 also includes an annular housing assembly 64 that supports the shaft assembly 46 for rotation about a substantially transverse and horizontal axis 65 and, thus, the wheel assembly 16 on the front end of the support member 32 of the pivoting beam 30. As is shown in FIGS. 3 and 4, the support member 32 has a reduced width neck portion identified by the reference number 66 that extends generally forwardly between an annular peripheral gap 68 defined between the side portions 42 and 44 of the wheel assembly, and an enlarged front mounting flange 70 defining a planar front surface 72. A corresponding planar rear surface 74 is defined on the rear of the housing assembly 64, and a plurality of fasteners or bolts 76 extend forwardly through the mounting flange 70 and are screwthreadably received in the housing assembly.

Figure 5:
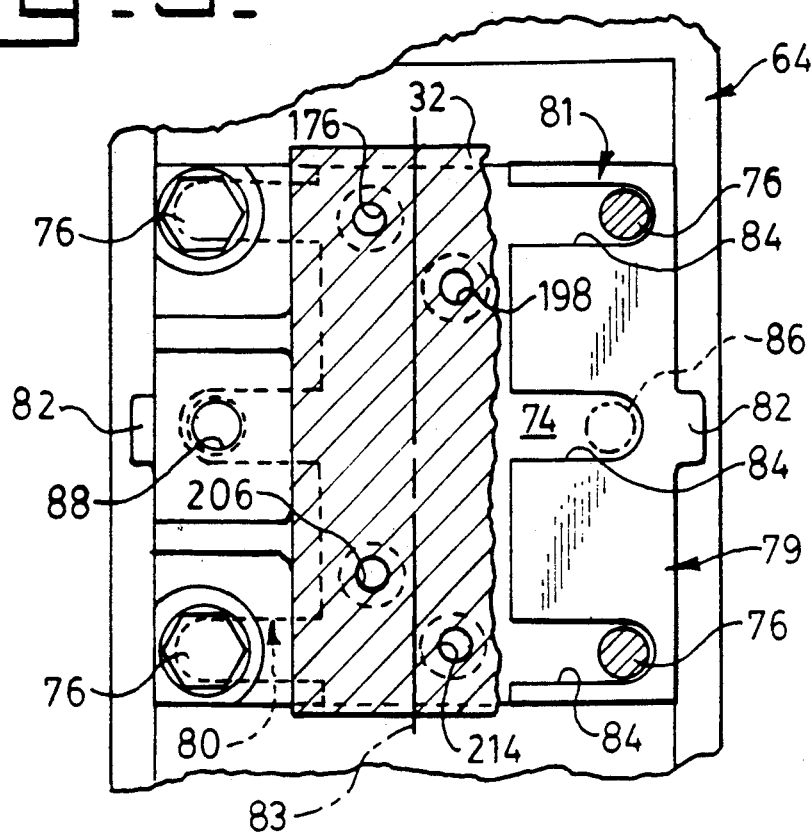
FIG. 5 is a transverse sectional view of the wet disc brake mechanism as taken along line 5—5 of FIG. 4 with a portion of the support member broken away to show a full outline of a shim.

As best shown in FIG. 5, an adjustment device 79 is provided that includes a plurality of inboard and outboard shims 80 and 81 that can be inserted between the surfaces 72 and 74 at the inboard and outboard locations respectively for adjusting the angular disposition of the housing assembly 64 relative to the support member 32, and thus the inclination angle of the central axis 65 of the wheel assembly 16. Each of the shims 80 and 81 is of a generally rectangular shape with a centrally located grasping tang 82 that extends outwardly away from a central, longitudinally extending vertical plane 83, and with three slots 84 opening inwardly on that plane. The slots 84 provide clearance for the bolts 76, and a service bolt 86 shown in phantom lines in FIGS. 4 and 5 that can be inserted in a threaded bore 88 located vertically between the pairs of bolts 76.

Referring now to FIG. 2, it can be noted that the housing assembly 64 has the following four major pieces: an inner sidewall 90, an outer sidewall 92, a generally tubular connecting section 94, and an internally splined ring 96. A stepped bore 98 is formed within the tubular connecting section 94 including an axially inner cylindrical surface 100, a reduced diameter cylindrical surface 102 defining an annular step 104 therewith, and an axially outer cylindrical surface 106. The splined ring 96 has an internal spline 108, an external peripheral groove 110, and a plurality of radial openings 112 therethrough communicating between the internal spline and the groove. When the splined ring 96 is installed tightly within the inner cylindrical surface 100 and secured in place axially against the step 104 an annular fluid collecting chamber 114 is defined therebetween.

The disc brake mechanism 40 further includes a brake hub 116 having an outer ring portion 118 defining an external spline 120, an inner cylindrical fluid distribution surface 122, and a plurality of radial openings 124 communicating the distribution surface with the external spline. An internal spline 126 defined within the brake hub is intermeshed with the central spline 50 of the shaft 48, and a properly sized thrust washer 128 is located at each end thereof. A pair of opposed tapered roller bearings 130 and 132 are mounted within the sidewalls 90 and 92 respectively, and seated on the shaft surfaces 52 for rotatably supporting the shaft assembly 46 within the housing assembly 64. The inner and outer side portions 42 and 44 have internal splines 134 intermeshingly connected to the outer splines 54 of the shaft 48, and the nuts 62 and thrust washers 60 serve to axially contain these elements together on the shaft. A cover plate 136 is releasably secured to each of the side portions in a conventional manner to protect the outer ends of the shaft assembly and to retain fluid within the brake mechanism, and inboard and outboard seal devices 138 and 140 of the usual type are connected between the side portions 42,44 and the sidewalls 90,92 respectively for retaining fluid and excluding the entry of foreign material into a central oil chamber 93 thereby defined within the disc brake mechanism.

As is illustrated in FIG. 2, the outboard sidewall 92 is contoured in cross section to define an annular spring-receiving pocket 142, an axially inwardly extending cantilevered ring 144 defining radially outer and inner cylindrical surfaces 146 and 148, and a plurality of circumferentially spaced blind threaded bores 150. The brake mechanism 40 further includes a dual piston brake assembly 151 having a radially outer parking brake piston 152 that is sealingly and reciprocally engaged with the cylindrical surfaces 102, 106 and 146, and a radially inner service brake piston 154 that is sealingly and reciprocally engaged with the parking brake piston 152 and the cylindrical surface 148. The parking brake piston 152 is continuously urged to the left when viewing FIG. 2 toward an engaged position of the brake assembly 151 by an axially compact Belleville spring set 156 of conventional construction, and is normally urged to a retracted position against a stop surface 158 by fluid pressure in an annular retraction chamber 160 which acts in a direction to compress the Belleville spring set. The service brake piston 154 has a radially inner flange 161 and is oppositely continuously urged to the right when viewing FIG. 2 toward a retracted position by a plurality of coiled compression springs 162 seated between the flange and the head end of a corresponding plurality of bolts 164 screwthreadably secured in the bores 150 in the outboard sidewall 92. The service brake piston 154 is controllably moved to left to the engaged position by fluid pressure in an annular actuating chamber 166. The brake assembly 151 also includes a first plurality of plates 168 which are non-rotatably engaged with the internal spline 108 of the housing assembly 64, and a second plurality of plates or discs 170 which are interleaved with the plates 168 and connected to rotate with the external spline 120 of the brake hub 116. Although not shown in the drawings, the brake discs 170 have friction material facings thereon that are appropriately grooved for allowing a fluid to cool the interengaging surfaces thereof as is known in the art.

Figure 6:
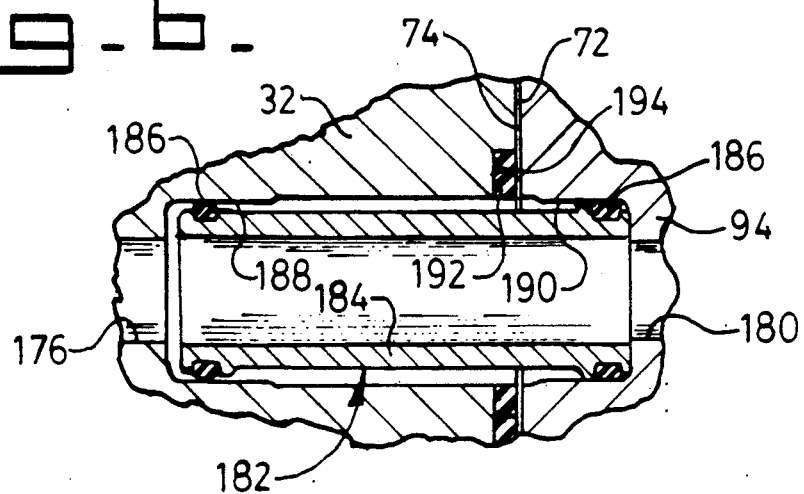
FIG. 6 is an enlarged sectional view of the telescopic coupling shown in FIG. 3 in the broken away window portion thereof.

As is shown in FIGS. 2-4, passage means 172 are defined in the front support member 32 of the pivoting beam 30, in the housing assembly 64, and in the brake hub 116 for the ingress of a cooling fluid radially inwardly of the interleaved plates 168 and discs 170, for the egress of the cooling fluid radially outwardly from the collecting chamber 114, for urging the service brake piston 154 toward a position of controllably clamping the interleaved plates 168 and discs 170 together, and for urging the parking brake piston 152 toward the retracted position. As shown in FIG. 3, a right angle pipe joint 174 is externally located on the inside surface of the support member 32 and is used for connecting an internal outlet passage 176 in the support member to an external tube or connecting line 178. The outlet passage 176 extends forwardly and is in fluid communication with another passage 180 formed in the connecting portion 94 of the housing assembly 64 and freely communicating with the collecting chamber 114. A telescopic coupling 182 extends across the interface between the support member and the connecting portion, and as shown best in FIG. 6 includes a connecting sleeve 184 having an external seal ring 186 at each end seated in a slightly enlarged cylindrical bore 188 in the support member and a similar bore 190 in the connecting portion. An optional sealing ring or washer 192 is also shown seated in a counterbore 194 of the support member.

As is illustrated in FIGS. 3 and 4, another pipe joint 196 is connected to the top surface of the support member 32 in communication with another external tube or connecting line 197 and an internal inlet passage 198 for directing a cooling fluid to the brake assembly 151. The inlet passage 198 is connected to another passage 200 in the connecting portion 94 of the housing assembly 64 through a second telescoping coupling 202 similar to coupling 182. Advantageously, the passage 200 shown also in FIG. 2 has an outlet port 203 oriented parallel to the shaft axis 65 and located at a smaller radius from the axis than the ring portion 118 of the brake hub 116.

As shown in FIG. 4, the passage means 172 further includes a pipe joint 204 connected to the pivoting beam 30 rearly of the pivot pin 28 and in serial relation between an external tube 205 and a service brake pressure passage 206. The passage 206 is likewise connected to another passage 208 in the connecting portion 94 by a third telescopic coupling 210, and as shown in FIG. 2 the passage 208 leads to the service brake actuating chamber 166.

And, in addition, a pipe joint 212 is connected to the pivoting beam 30 below the pipe joint 204 to enable an external tube 213 to pressurize an internal passage 214 in the support member 32 for holding the parking brake piston 152 in the retracted mode. The retraction chamber 160 is in fluid communication with the passage 214 by another passage 16 formed in the connecting portion 94 of the housing assembly 64 and a fourth telescopic coupling 218 therebetween.

INDUSTRIAL APPLICABILITY

In operation, the suspension mechanism 10 is constructed to allow the vehicle to go over an 8 inch high obstacle without undue rocking of the vehicle's superstructure. When the belt 14 and wheel assembly 16 encounter an obstacle the pivoting beam 30 directs a longitudinally rearwardly directed thrust component against the coupling assembly 20 through the pivot pin 28. The support shaft 22 is subsequently allowed to travel generally rearwardly against the resilient loading of the recoil mechanism of the suspension mechanism, not shown. As the front idler wheel assembly 16 travels over the obstacle the pivoting beam 30 rotates in a generally counterclockwise direction when viewing FIG. 1, about pivot pin 28 and elevates it due to the downward loading of the roller wheels 18 on the rear leg 34. For a more complete understanding of the operation of the suspension mechanism 10, reference is made to previously mentioned U. S. Pat. No. 4,881,609 and U.S. Pat. No. 4,817,746 issued Apr. 4, 1989 to R. J. Purcell, et al.

It can be appreciated, however, that the internal fluid passage means 172 in the support member 32, the housing assembly 64, and the brake hub 116 shown in FIGS. 2-4 are in protected locations even though the wheel assembly 16 is exposed to such oscillatory motions. The external tubes 178, 197, 205 and 213 are connected to the pivoting beam 30 generally close to the pivot pin 28 and above the upper surface thereof in relatively less exposed locations so that they are unlikely to be damaged in use.

In normal operation, the parking brake piston 152 is continuously urged to the right when viewing FIG. 2 to a retracted position by pressurized fluid in the retraction chamber 160. The service brake piston 154 is also normally urged to the right to the retracted position by the compression springs 162. When the vehicle operator applies the usual brake pedal, not shown, the actuating chamber 166 is controllably pressurized in a conventional manner via the tube 205 and the passages 206 and 208 to bias the service brake piston to the left against the reaction of the springs 162, whereupon the interleaved plates 168 and discs or plates 170 are clamped together. This retards the rotation of the brake hub 116 relative to the housing assembly 64 and controllably brakes the wheel assembly 16.

Preferably, the inlet tube 197 and the passages 198 and 200 are continuously pressurized so that a cooling fluid is directed axially outwardly of the outlet port 203 shown in FIG. 2 for cooling the interleaved plates 168 and 170 at a preselected relatively low volumetric rate. Note that such fluid is directed radially outwardly through the openings 124 in the outer ring portion 118 of the brake hub 116, radially outwardly through the usual grooves formed in the friction material of the discs 170 although not illustrated, and radially outwardly through the openings 112 formed in the ring 96 relatively directly into the collecting chamber 114 with minimal back pressure. From the collecting chamber, the heated cooling fluid is directed to the passage 180 as best shown in FIG. 3, and through the sealed coupling 182 to the passage 176, the pipe joint 174 and the outlet tube 178 to be returned to a conventional sump, not shown. It can be appreciated that the seal devices or seal rings 138 and 140 serve to contain the fluid within the wheel assembly 16 as well as to exclude dirt or other debris from entering it. This greatly extends the life of the brake assembly 151.

In the event that the vehicle 12 is shut down for parking purposes, the normally pressurized tube 213, the passages 214 and 216, and the retraction chamber 160 are depressurized. Consequently, the Belleville spring set 156 urges the parking brake piston 152 to the left, when viewing FIG. 2, against the service brake piston 154, compresses the springs 162, and causes the service brake piston to mechanically clamp the plates 168 and 170 together and to lock the brake hub 116 to the housing assembly 64.

Should it be desirable to change the orientation of the wheel assembly 16 relative to the pivoting beam 30 or the support member 32, this can be easily accomplished. First the bolts 76 shown in FIGS. 3-5 are partially screwthreadably released from the housing assembly 64, and the bolts 86 shown in phantom in FIG. 4 are screwthreadably inserted into the bores 88 to cause a limited separation of the mounting flange 70 from the rear surface 74 of the housing assembly. Then one or more of the inboard shims 80 or outboard shims 81 can be removed (or added) by grasping the tangs 82, so that there are for example more shims on the outboard shim stack than on the inboard shim stack. When the separating bolts 86 are removed and the retaining bolts 76 screwthreadably secured back into the housing assembly 64, there will be a greater longitudinal distance between the surfaces 72 and 74 adjacent the outboard portion of the mounting flange and a smaller distance at the inboard portion. This will cause the horizontal wheel axis 65 to be slightly inclined in the top plan view, and will cause the belt 14 to tend to move laterally inwardly. Such compensation is desirable if the natural tendency of the belt is to otherwise drift laterally outwardly and to cause wear and heat build-up of the outboard surfaces of the guide members 19 and inboard surfaces of the supporting wheels 18 and/or the front idler wheel assembly 16 as can be visualized by reference to FIG. 2. During the full period of adjusting the shims located between the opposed planar surfaces 72 and 74, the couplings 182 shown in FIG. 6 will positively retain oil or other fluids within the wet disc brake mechanism 40 because the seals 186 can telescope within the respective cylindrical surfaces 188 and 190.

Accordingly, it is clear that the wet disc brake mechanism 40 of the present invention is simple and compactly located within the side portions 42 and 44 of the wheel assembly 16. Moreover, the support member 32 and housing assembly 64 are provided with internal passage means 172 so as to permit the positive control of a service brake piston 154 and a parking brake piston 152, as well as preferably positive forced cooling of the interleaved plates 168 and 170 in a particularly effective radially outwardly flowing manner so that there is minimal back pressure in the central oil chamber 93 and less detrimental influence on the seal devices 138 and 140. Furthermore, the parking brake piston is continually biased toward overlapping engagement with the service brake piston by the relatively axially compact Belleville spring set 156 substantially axially aligned with the interleaved plates 168 and 170 to minimize the axial length thereof. Moreover, the service brake piston is continuously biased to a retracted condition by the axially less compact plurality of compression springs 162 located axially between the brake hub 116 and the outboard sidewall 92 and closer to the axis 65 than the interleaved plates for compactness.

Other aspects, objects and advantages of this invention can be obtained from a study of the drawings, the disclosure and the appended claims.

I claim:

1. A wet disc brake mechanism for a vehicle comprising:
   a wheel assembly having an axially inner side portion, an axially outer side portion, a wheel shaft connecting the inner and outer side portions, an annular housing assembly rotatably supporting the wheel shaft for rotation about an axis and located between the side portions within the wheel assembly;

a support member connected to the vehicle and extending radially inwardly between the side portions and connected to the housing assembly for supporting the wheel assembly;

a brake hub connected to the wheel shaft;

adjustment means for adjusting the angular disposition of the housing assembly relative to the support member and thereby the angular disposition of the wheel axis;

a brake assembly including a first plurality of plates connected to the housing assembly, a second plurality of plates connected to the brake hub and interleaved with the first plurality of plates, and actuating means within the housing assembly for controllably clamping the interleaved plates together and braking the wheel assembly; and passage means for delivering a control fluid to the actuating means for controlled operation of the brake assembly, the passage means being defined within the support member and the housing assembly, said passage means including coupling means for retaining fluid within the housing assembly while said adjustment means are being adjusted, said coupling means including a telescopic coupling sleeve positioned within said passage means and a plurality of sealing rings positioned on said coupling sleeve.

2. The wet disc brake mechanism of claim 1 wherein the passage means includes fluid directing means for the ingress of a cooling fluid directly radially inwardly to the interleaved plates and the egress of the cooling fluid directly radially outwardly from the interleaved plates.

3. The wet disc brake mechanism of claim 2 wherein the fluid directing means includes a first plurality of radial openings in the brake hub radially within the interleaved plates, and a second plurality of radial openings in the housing assembly radially outside the interleaved plates.

4. The wet disc brake mechanism of claim 1 wherein the passage means includes in serial relation a fluid cooling inlet passage in the support member, a passage in the housing assembly, and an outlet port located radially within the brake hub.

5. The wet disc brake mechanism of claim 4 wherein the housing assembly defines an annular collecting chamber in an encircling relationship with the interleaved plates, and the passage means includes in serial relation an outlet passage in the housing assembly connected to the collecting chamber 6. The wet disc brake mechanism of claim 1 wherein the support member defines a planar surface, the housing assembly defines a planar surface, and the adjustment means includes at least one shim entrapped between the planar surfaces for adjusting the angularity between the planar surfaces.

7. The wet disc brake mechanism of claim 1 wherein the brake assembly includes a service brake piston and a plurality of axially oriented compression springs for positively retracting the service brake piston, the compression springs being located closer to the axis than the interleaved plates for compactness.

8. The wet disc brake mechanism of claim 7 wherein the brake assembly includes a parking brake piston telescopically overlapping the service brake piston and an axially compact Belleville spring set for positively urging the parking brake piston against the service brake piston.

9. A wet disc brake mechanism for a vehicle comprising:

a wheel assembly having an axially inner side portion, an axially outer side portion, a wheel shaft connecting the inner and outer side portions, an annular housing assembly rotatably supporting the wheel shaft for rotation about an axis and located between the side portions within the wheel assembly;

a support member connected to the vehicle and extending radially inwardly between the side portions and connected to the housing assembly for supporting the wheel assembly;

a brake hub connected to the shaft and having an outer ring portion, an external spline, and a first plurality of radial openings through the outer ring portion;

the housing assembly having an internal spline, an annular collecting chamber, and a second plurality of radial openings communicating the internal spline with the collecting chamber;

adjustment means for adjusting the angular disposition of the housing assembly relative to the support member and thereby the angular disposition of the wheel axis;

a brake assembly including a first plurality of plates connected to the internal spline, a second plurality of plates connected to the external spline and interleaved with the first plurality of plates, and actuating means for controllably clamping the interleaved plates together;

means for positively directing the ingress of a cooling fluid to the first plurality of radial openings, and for exhausting the fluid from the collecting chamber after passing radially outwardly between the interleaved plates and passage means for delivering a control fluid to the actuating means, said passage means including coupling means for retaining fluid within the housing assembly while said adjustment means are being adjusted, said coupling means including a telescopic coupling sleeve positioned within said passage means and a plurality of sealing rings positioned on said coupling sleeve.

10. A wet disc brake mechanism for a vehicle comprising:

a wheel assembly having an axis, an axially inner side portion, an axially outer side portion, a shaft connecting the side portions, and an annular housing assembly rotatably supporting the shaft about said axis, and located between the side portions within the wheel assembly;

a support member connected to the vehicle and extending radially inward between the side portions and connected to the housing assembly for supporting the wheel assembly;

a brake hub connected to the shaft;

adjustment means for adjusting the angular disposition of the housing assembly relative to the support member and thereby the angular disposition of the wheel axis;

an annular service brake piston located within the housing assembly;

an annular parking brake piston located within the housing assembly in a surrounding telescopic relationship with the service brake piston;

first spring means for retracting the service brake piston;

second spring means for urging the parking brake piston against the service brake piston;

fluid retraction means for biasing the parking brake piston to a disengaged position against the action of the second spring means;

fluid actuating means for controllably urging the service brake piston toward a brake holding position with respect to the brake hub against the action of the first spring means;

passage means for delivering a control fluid to the actuating means, said passage means including coupling means for retaining fluid within the housing assembly while said adjustment means are being adjusted, said coupling means including a telescopic coupling sleeve positioned within said passage means and a plurality of sealing rings positioned on said coupling sleeve;

an internally splined ring, said ring being adapted to be secured within said housing, and said ring and said housing defining an annular fluid collecting chamber therebetween.

11. The wet disc brake mechanism of claim 10 wherein the first spring means includes a plurality of coiled compression springs located closer to the axis than the interleaved plates for compactness.

12. The wet disc brake mechanism of claim 11 wherein the second spring means includes a Belleville spring set substantially axially aligned with the interleaved plates to minimize the axial length thereof.

13. The wet disc brake mechanism of claim 10 including a support member extending radially inwardly between the side portions for supporting the housing assembly, the fluid retraction means and the fluid actuating means including a plurality of internal passages defined in the support member and the housing assembly.

* * * * *